US009474100B2

(12) United States Patent
Lam (10) Patent No.: US 9,474,100 B2
(45) Date of Patent: Oct. 18, 2016

(54) RELAYING DEVICES FOR WIRELESS MESH NETWORK

(75) Inventor: Pak Kit Lam, Shatin (HK)

(73) Assignee: P2 MOBILE TECHNOLOGIES LIMITED, Shatin, New Territories (HK)

( * ) Notice: Subject to any disclaimer, the term of this patent is extended or adjusted under 35 U.S.C. 154(b) by 167 days.

(21) Appl. No.: 13/408,047

(22) Filed: Feb. 29, 2012

(65) Prior Publication Data

US 2013/0107792 A1  May 2, 2013

(30) Foreign Application Priority Data

Oct. 28, 2011  (HK) .................................... 11111668

(51) Int. Cl.
*H04W 88/04* (2009.01)
*H04W 84/18* (2009.01)

(52) U.S. Cl.
CPC ............. *H04W 84/18* (2013.01); *H04W 88/04* (2013.01)

(58) Field of Classification Search
CPC .... H04W 80/06; H04W 84/18; H04W 88/04
USPC .......................................................... 370/315
See application file for complete search history.

(56) References Cited

U.S. PATENT DOCUMENTS

| | | | | |
|---|---|---|---|---|
| 6,795,701 B1 * | 9/2004 | Baker | ..................... | H04L 63/08 370/395.52 |
| 8,296,453 B1 | 10/2012 | Margulis | | |
| 8,634,392 B2 * | 1/2014 | Stephens | ............... | H04W 88/00 370/313 |
| 2005/0152305 A1 * | 7/2005 | Ji | ............................ | H04L 45/54 370/328 |
| 2005/0232179 A1 * | 10/2005 | daCosta | ................ | H04W 84/00 370/315 |
| 2006/0056370 A1 * | 3/2006 | Hancock | ............. | H04B 7/2606 370/338 |

(Continued)

FOREIGN PATENT DOCUMENTS

| | | |
|---|---|---|
| CN | 102065509 A | 5/2011 |
| CN | 102347970 A | 2/2012 |

OTHER PUBLICATIONS

Chaudet, Claude, Dominique Dhoutaut, and Isabelle Guérin Lassous, "Performance Issues with IEEE 802.11 in Ad Hoc Networking," *Communications Magazine, IEEE* 43.7 (2005): 110-116.

(Continued)

*Primary Examiner* — Andrew Chriss
*Assistant Examiner* — Rasha Fayed
(74) *Attorney, Agent, or Firm* — Morrison & Foerster LLP (57) ABSTRACT

A relaying device, such as a router, especially those for forming the backbone of a wireless mesh network, comprises a first wireless frontend and a second wireless frontend which are to communicate with each other to facilitate data communication between a first external device and a second external device. The first wireless frontend is to communicate wirelessly with the first external device and the second wireless frontend is to communicate with the second external device using IEEE 802.11 infrastructure mode transmission protocol. Such a relaying device facilitates the cost effective construction of a high speed WMN of say 300 Mbps using infrastructure mode protocol contrary to conventional wisdom.

12 Claims, 5 Drawing Sheets

(56) References Cited

U.S. PATENT DOCUMENTS

| | | | | |
|---|---|---|---|---|
| 2006/0193283 A1* | 8/2006 | Harris | H04W 88/04 | 370/328 |
| 2007/0008922 A1* | 1/2007 | Abhishek | H04W 72/02 | 370/329 |
| 2007/0070959 A1* | 3/2007 | Almeroth | H04W 40/28 | 370/338 |
| 2007/0183439 A1* | 8/2007 | Osann, Jr. | H01Q 25/00 | 370/406 |
| 2008/0025330 A1* | 1/2008 | Wang | H04L 63/0428 | 370/406 |
| 2008/0080414 A1* | 4/2008 | Thubert | H04W 76/022 | 370/328 |
| 2008/0151821 A1* | 6/2008 | Cho | H04W 16/10 | 370/329 |
| 2008/0205385 A1* | 8/2008 | Zeng | H04L 45/00 | 370/389 |
| 2009/0052463 A1* | 2/2009 | Chen | H04W 72/1236 | 370/406 |
| 2009/0067362 A1* | 3/2009 | Doppler | H04L 1/1607 | 370/315 |
| 2010/0220701 A1* | 9/2010 | Levy | H04L 12/4625 | 370/338 |
| 2010/0238835 A1* | 9/2010 | Lundgren | H04L 12/2697 | 370/253 |
| 2010/0238855 A1* | 9/2010 | Yoshida | H04B 7/155 | 370/315 |
| 2010/0246480 A1* | 9/2010 | Aggarwal | H04L 45/123 | 370/328 |
| 2010/0260146 A1* | 10/2010 | Lu | H04L 12/4633 | 370/331 |
| 2010/0296496 A1* | 11/2010 | Sinha | H04W 12/12 | 370/338 |
| 2011/0090853 A1* | 4/2011 | Chandramouli | H04W 28/10 | 370/329 |
| 2012/0033568 A1 | 2/2012 | Park et al. | | |

OTHER PUBLICATIONS

IEEE Std 802.11s-2011, IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 10: Mesh Networking, IEEE Computer Society, Sponsored by the LAN/MAN Standards Committee, IEEE, New York, Sep. 10, 2011 (372 pages).

International Search Report received for PCT Patent Application No. PCT/IB2013/051499, mailed on Jul. 18, 2013, 3 pages.

Office Action received for Australian Application No. 2013227334, mailed on Jan. 29, 2016, 3 pages.

International Preliminary Report on Patentability received for PCT Patent Application No. PCT/IB2013/051499, issued on Aug. 9, 2016, 6 pages.

* cited by examiner

RELAYING DEVICES FOR WIRELESS MESH NETWORK

The present disclosure relates to relaying devices for data communications, and more particularly to wireless relaying devices such as routers. This disclosure also relates to wireless backbone network of wireless mesh networks.

Wireless mesh networks (WMN) are useful in many applications because of their low up-front costs, flexibility in incremental deployment and ease of maintenance. For example, WMN are widely used in community networks, enterprise networks, video surveillance, voice communications and localization services. Wireless mesh network architecture is often seen as a first step towards providing cost effective and dynamic high-bandwidth networks over a specific coverage area. A wireless mesh network can be seen as a special type of a wireless ad-hoc network using IEEE 802.11 ad-hoc protocol for backbone infrastructure. A wireless mesh network often has a more 'planned' configuration, and may be deployed to provide dynamic and cost effective connectivity over a certain geographic area. An ad-hoc network, on the other hand, is formed ad hoc when wireless devices come within communication range of each other.

It is known that almost all mesh nodes in existing wireless mesh networks (WMNs) run with the Independent Basic Service Set, or IBSS (also known as ad-hoc) mode defined in the 802.11 standard. Since the development of IBSS is well behind the infrastructure mode counterpart of the same 802.11 version, performance of commercially available WMNs are always well behind the latest 802.11 technology.

When a WMN is to be expanded, the expansion is required to be running with the compatible IBSS mode feature set as the existing WMN (the IBSS mode is even required not to enable some new features such as HT40). As a result, newer technologies cannot be integrated into the existing WMNs at all.

Furthermore, as most modern wireless mesh backbone networks adopt the IEEE 802.11 a/g/n standards and use a rate of 54 Mbps for network communication using ad-hoc protocol, network through-put would be degraded to below 54 Mbps. As a result, work in ad hoc routing protocols for wireless networks has focussed on coupling with scalability or finding high-quality paths in the face of lossy wireless links.

It is also noted that while the infrastructure mode of the 802.11n standard has been available for years, there is still no real 802.11n based WMN mode products available in the market and this has caused unnecessary degrade in performance.

Therefore, it would be advantageous if there can be provided relaying devices for WMN which mitigates the known shortcomings.

There is provided a relaying device for forming a wireless mesh network, the relaying device comprising a first wireless frontend and a second wireless frontend which are to communicate with each other to facilitate data communication between a first external device and a second external device, wherein the first wireless frontend is to communicate wirelessly with the first external device and the second wireless frontend is to communicate with the second external device using IEEE 802.11 infrastructure mode transmission protocol.

A wireless relaying device having first and second wireless frontends which are adapted to communicate wirelessly with external devices using the infrastructure mode protocol is advantageous because this facilitates the building of wireless mesh network backbones using infrastructure mode protocol. In other words, the backbone building wireless routers will use infrastructure mode protocol for inter-router communications. It will be appreciated that the use of the infrastructure mode protocol for inter-router communication is contrary to standard or established practice in wireless mesh networking, but is highly advantageous in that because the infrastructure mode protocol is already ready whenever there is an upgrade in standards so that there is no need to wait for the "ad hoc" protocols, and that the current infrastructure mode protocols are about 6 times faster than the current 'ad hoc' protocol WMN products in the market.

For example, a WMN backbone network comprising a plurality of wireless relaying devices adopting the currently state-of-the-art IEEE 802.11n infrastructure mode transmission protocol as the inter-router communication protocol can support a data rate as set by IEEE 802.11n, namely 300 Mbps. This is highly advantageous compared to a wireless backbone built using conventional technology from wireless relaying devices which is limited by the state-of-the-art 'ad hoc' mode data rate, which is currently 54 Mbps. A further advantage of wireless relaying devices utilizing the infrastructure mode transmission protocol as the inter-router or inter-relaying devices communication protocol is that the infrastructure mode will be available when a new standard is introduced and well before the 'ad hoc' mode. This means the speed of wireless relaying devices utilizing the present disclosure can deploy and operate at a speed stipulated by a new infrastructure mode protocol whenever the new protocol is introduced.

The application of the infrastructure mode protocol as the WMN protocol for wireless routers is contrary to conventional wisdom because infrastructure mode protocol is not considered for conventional "Multi-hop" applications such as WMN. Traditionally, 802.11's infrastructure mode is designed to allow one or more Wi-Fi stations (STA) to connect to a Wi-Fi access point (AP) in a Single-Hop manner, the AP then in turn connects to the LAN backbone, or eventually to the Internet, through an Ethernet cable. Such an established application of the infrastructure mode protocol is apparently not compatible to support Multi-hop WMN operations.

Example wireless routers for WMN operation will be described below by way of example below with reference to the accompanying drawings, in which:

FIGS. 4 and 4A are schematic diagrams depicting a first and a second example network topologies.

Figure 1:
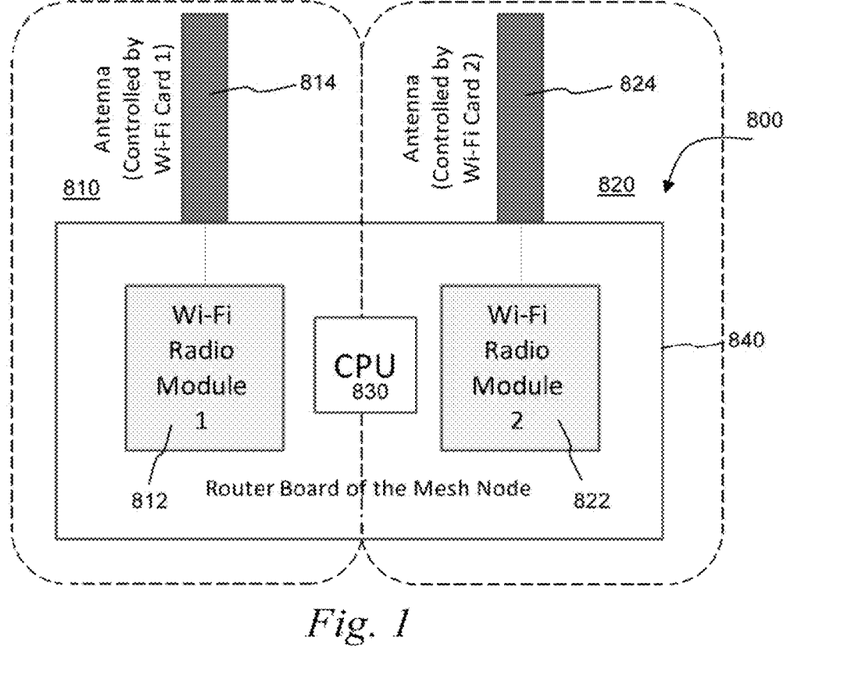
FIG. 1 is a schematic diagram of a router suitable for use in a WMN.

A wireless router 800 of FIG. 1 comprises a first wireless frontend 810 and a second wireless frontend 820. The first wireless frontend 810 comprises a WiFi radio module 812 which is connected to a first antenna 814 and controlled by a microprocessor 830. The second wireless frontend 820 comprises a WiFi radio module 822 which is connected to a first antenna 824 and also controlled by the same microprocessor 830 to enhance cost effectiveness.

The first 810 and second 820 wireless frontends are interconnected in a back-to-back manner by means of a router board so that data can flow between the first and second wireless frontends when received from one antenna for transmission by another antenna to the ambience under the control of the microprocessor when the microprocessor executes instructions stored in the memory.

The first wireless frontend 810, as an example of a first wireless interface, is adapted to communicate with an external wireless device using infrastructure mode routing protocol. Likewise, the second wireless frontend 820, as an example of a second wireless interface, is adapted to communicate with an external wireless device also using the infrastructure mode routing protocol. In one router example 860, the first wireless frontend is configured as an access point and the second wireless frontend is configured as a client. In another router example 870, both the first and second wireless frontends are configured as access point. In yet another router example 880, both the first and second wireless frontends are configured as client. The terms 'client', 'access point', and 'infrastructure mode' herein are terms well known to persons skilled in the art and defined in IEEE 802.11 standards which are incorporated herein and without loss of generality.

As depicted in FIG. 1, the wireless router 800 comprises a first WiFi radio module 812 which is configured to operate as the first wireless frontend, a second WiFi radio module 822 which is configured to operate as the second wireless frontend, and a microprocessor 830 which connects the first and the second wireless frontends in a back-to-back manner to facilitate internal data communication between the first and second wireless frontends. The first 812 and the second WiFi 822 modules are connected respectively to a first antenna 814 and a second antenna 824 to facilitate wireless data communications Specifically, the first antenna 814 is adapted to cooperate with the first WiFi module 812 and the second antenna 824 is adapted to cooperate with the second WiFi modules 822 when under the control of the microprocessor 830 to facilitate wireless data communications with external data devices using infrastructure mode protocol. To mitigate radio interference, the first and second WiFi radio modules 812, 822 run on different frequencies.

Figure 2:
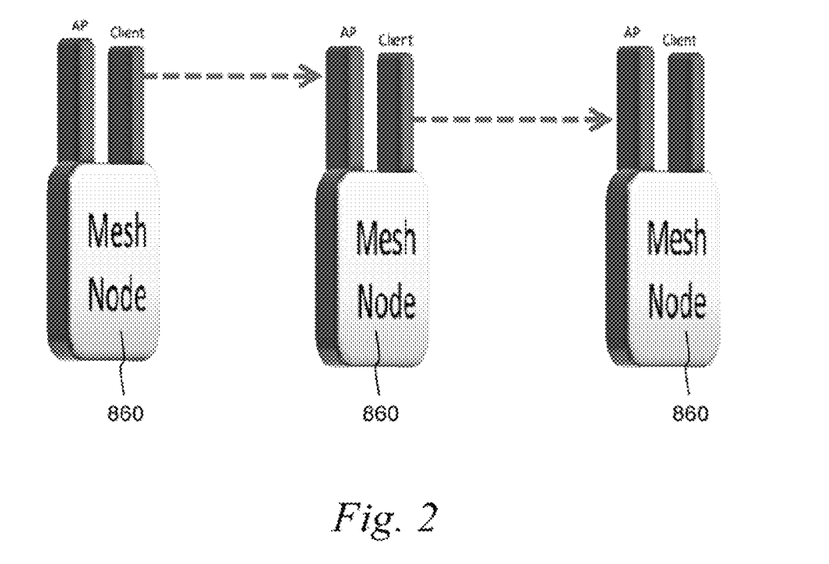
FIG. 2 is a schematic diagram depicting a plurality of routers of FIG. 1 in operation.

The microprocessor 830, or CPU in short, includes peripheral circuits which are mounted on a printed circuit board (PCB) to form a CPU module or router board as is commonly known to persons skilled in the art. Usually, the WiFi modules, the CPU and peripheral circuits and the first and second antennae are all mounted on a rigid housing 840 for easy deployment. In an example use as shown in FIG. 2, the wireless routers 860 are arranged in cascade.

As the first and second WiFi modules are arranged in a back-to-back manner, this router will also be referred to as a Back-N router herein.

Figure 3:
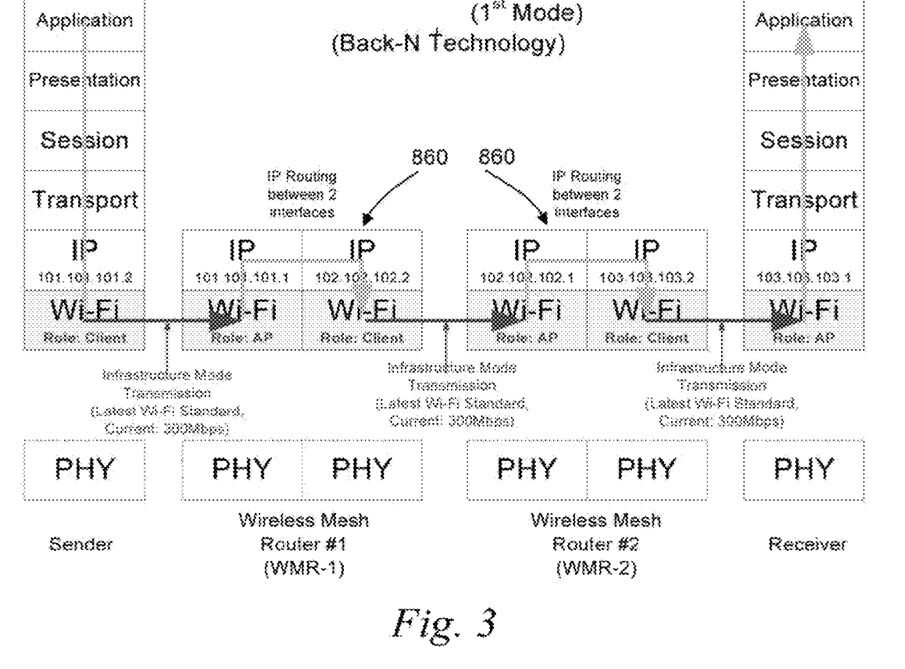
FIGS. 3, 3A and 3B are schematic diagrams depicting a first WMN, a second WMN and a third WMN each including a plurality of wireless routers according to the present invention with reference to the OSI model.

An example wireless network of FIG. 3 comprises a plurality of wireless routers 860 (WMR-1 & WMR-2) in cascade between a Sender and a Receiver. In this cascaded network, each of the cascaded wireless routers 860 comprises an access point (AP) interface and a client interface. Specifically, the AP interface of WMR-1 is connected to the client interface of the Sender, the client interface of WMR-1 is connected to the AP interface of WMR-2, and the client interface of WMR-2 is connected to the AP interface of the Receiver to form a cascade mesh network.

When a user wants to send data from the Sender to the Receiver through the wireless mesh network, the Sender will be a client in the 802.11 infrastructure mode, and the Sender will establish data connection with the AP interface of WMR-1 using the 802.11 protocol. When the Sender is connected to the AP interface of WMR-1, a multi-hop Wi-Fi connection is setup between the Sender and the Receiver.

In a wireless mesh network built with this methodology ('Back-N') as described herein, every Wi-Fi interface is associated with an IP address. In the examples shown in FIG. 3, the following exemplary IP addresses are assigned for the Wi-Fi interfaces as convenient examples:

| | | |
|---|---|---|
| a | Sender: | 101.101.101.2 |
| b | AP of WMR-1 | 101.101.101.1 |
| c | Client of WMR-1 | 102.102.102.2 |
| d | AP of WMR-2: | 102.102.102.1 |
| e | Client of WMR-2: | 103.103.103.2 |
| f | Receiver: | 103.103.103.1 |

Assuming that the Sender (a) now sends an IP packet to the Receiver (f), the destination field of the IP packet will be 103.103.103.1. When the packets travel down from the Application layer to the Wi-Fi layer (or MAC layer in OSI terms) of the Sender according to the OSI layering definition, the packet will be directly sent to the AP interface of WMR-1 using infrastructure mode protocol. (To be more exact, the packet will also go through the PHY layer of the Sender. For the sake of simplicity, let's ignore the PHY layer, and take Wi-Fi layer as the bottom layer of OSI). In the 802.11 Infrastructure mode, packets leaving the Sender's Client interface will have to go to the AP interface of WMR-1.

The packet will then traverse up the OSI layer of WMR-1 to the IP layer of the AP side. Noting that the packet is not destined to itself, it will then route the packet to an appropriate interface inside WMR-1 according to a pre-configured routing table using pseudo-codes like below:

```
If (IP == 101.101.101.1)
    Send it to Application
Else
    Send it to Client of WMR-1
```

As a result, the packet will be routed to the Client interface of WMR-1. When the packet reaches the Client Wi-Fi interface of WMR-1, again, it has no option but will be sent to the AP Wi-Fi interface of WMR-2 by way of infrastructure mode protocol. Similarly, the packet will then traverse up the OSI layer of WMR-2 to the IP layer of the AP side. Noting that the packet is not destined to itself, it will then route the packet to an appropriate interface inside WMR-2 according to the example routing table below:

```
If (IP == 102.102.102.1)
    Send it to Application
Else
    Send it to Client of WMR-2
```

In this example, the packet will be routed to the Client interface of WMR-2 using infrastructure mode interface. When the packet reaches the Client Wi-Fi interface of WMR-2, it again has no option but being sent to the AP Wi-Fi interface of Receiver, also by way of infrastructure mode protocol. Since the Receiver is indeed the destination of the packet, its IP layer will accept the packet and forward it up according to the OSI model to its application below:

```
If (IP == 103.103.103.1)
    Send it to Application
Else
    Send it to the Internet
```

If the destination address of the packet were not 103.103.103.1, it would have been routed to the interface leading to the Internet.

Figure 4:
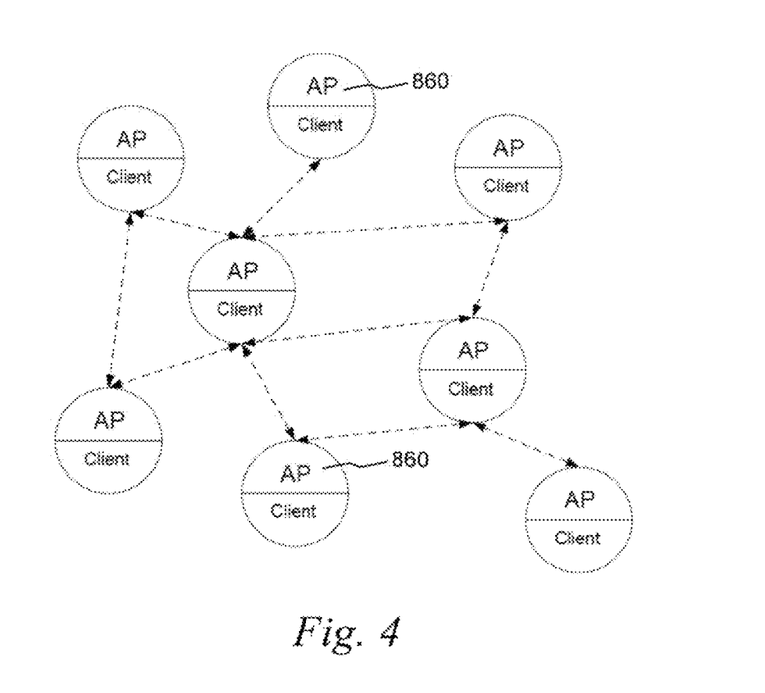

The wireless mesh network depicted in FIG. 4 is a 2-dimensional generalization of the cascaded WMN of FIG. 3 and comprises a plurality of WMR-1, or wireless mesh routers 860, in mesh network connection. In this 2-dimensional mesh network connection deployment, the data transport mechanism is identical in substance to that depicted in FIG. 3 and the descriptions above are incorporated herein mutatis mutandis by reference where appropriate. In particular, all inter-router or inter-WMR-1, or inter-wireless-mesh-routers 860 data communications as indicated by the dotted router interconnection lines are by way infrastructure mode protocol.

Figure 3A:
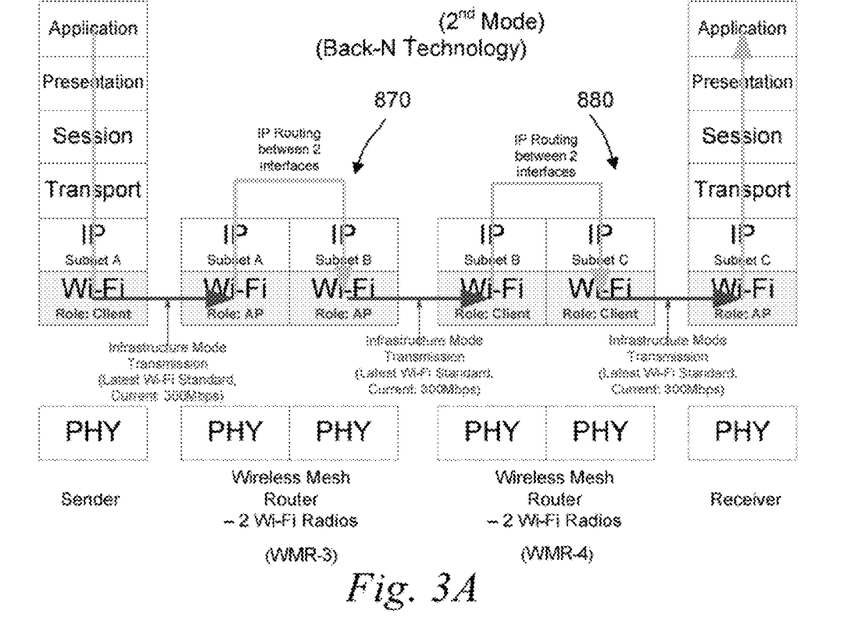

The cascade network of FIG. 3A is substantially identical to that of FIG. 3, except that WMR-1 is replaced with an AP-AP wireless mesh router 870 and WMR-2 is replaced with a client-client wireless mesh router 880. The data transport mechanism in this cascade deployment is identical in substance to that depicted in FIG. 3 and the descriptions above are incorporated herein mutatis mutandis by reference where appropriate.

Figure 4A:
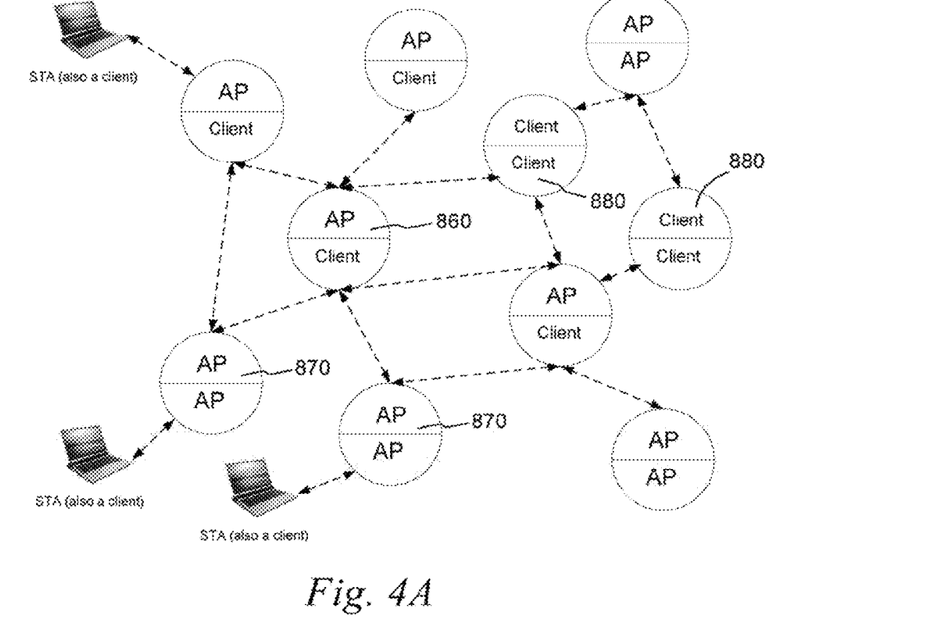

The 2-dimensional wireless mesh network configuration of FIG. 4A is an example WMN comprising a mixture of wireless mesh routers 860, 870, and 880. The data transport mechanism is in this cascade deployment is identical in substance to that depicted in FIG. 3 and the descriptions above are incorporated herein mutatis mutandis by reference where appropriate. In particular, all inter-router or inter-wireless mesh routers 860, 870, 880 data communications as indicated by the dotted router interconnection lines are by way infrastructure mode protocol.

Figure 3B:
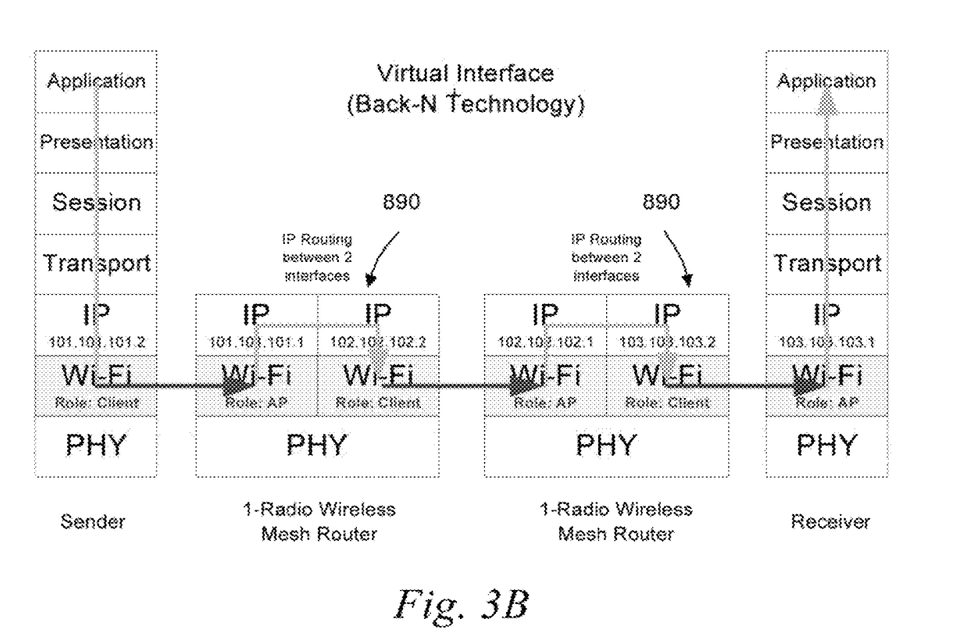

The cascade network of FIG. 3B is also substantially identical to that of FIG. 3, except that WMR-1 and WMR-2 having 2 Wi-Fi radio interfaces are replaced with wireless mesh router 890 having 2 virtual Wi-Fi radio interfaces. Wireless mesh router 890 have only one Wi-Fi radio interface. However, by using some software technique such as multi-threading, the single Wi-Fi radio interface of wireless router 890 behaves as an AP and as a client simultaneously. The virtual AP and client even have their own IP address. The data transport mechanism in this cascade deployment is identical in substance to that depicted in FIG. 3 and the descriptions above are incorporated herein mutatis mutandis by reference where appropriate.

It is appreciated that the configuration of interfaces in a Wireless mesh router is fully flexible. Specifically, all Back-N compatible wireless mesh routers have 2 or more Wi-Fi interfaces (physical or virtual), and all interfaces must be configured as either AP or client.

Figure 5:
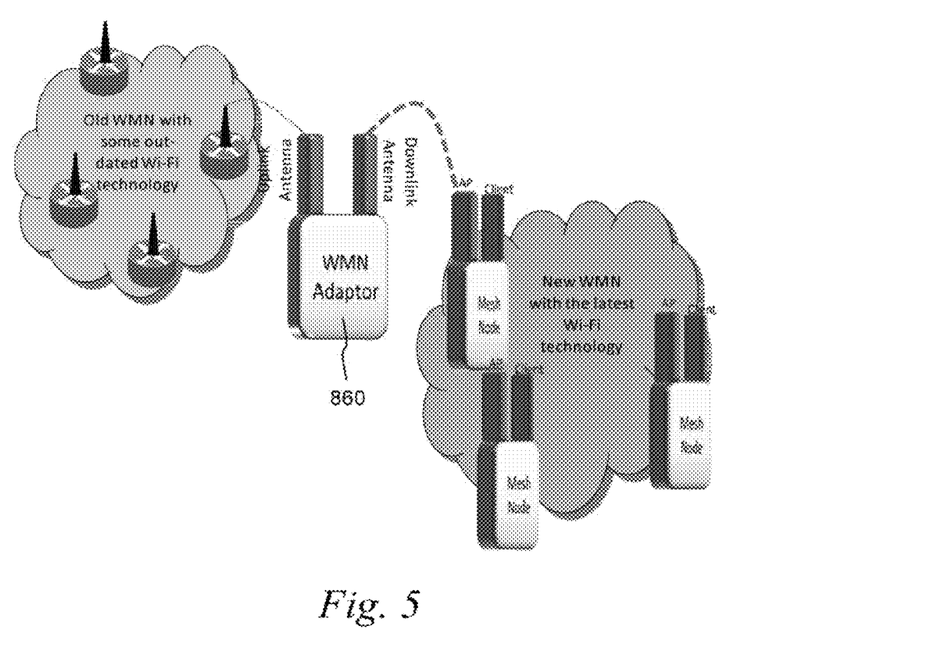
FIG. 5 is a schematic diagram depicting an example application of a WMN according to the present invention.

To provide compatibility with existing ad-hoc MWN, a 'mesh network adaptor' is provided as depicted in FIG. 5. The mesh network adaptor 860 is a wireless router that is capable of interfacing both existing MWN and new MWN running different 802.11 standards. The old WMN is expanded with the latest 802.11 standard without replacing any old equipment.

Figure 6:
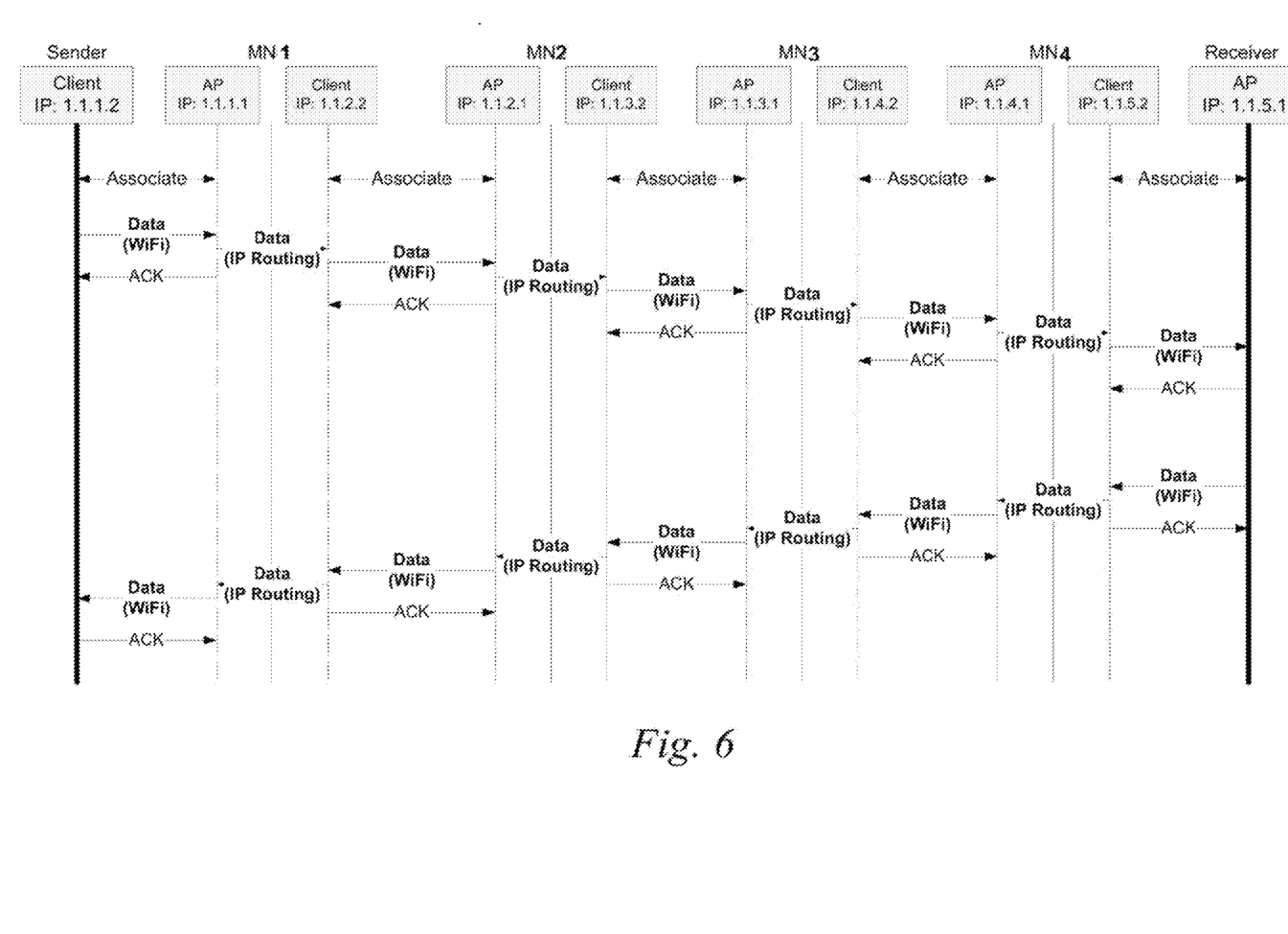
FIG. 6 is a schematic diagram depicting example data flow in a 6-hop WMN.

The wireless mesh network of FIG. 6 is similar to that of FIG. 3, except that two more Wireless Mesh Routers are included between Sender and Receiver. The data flow from Sender to Receiver depicted in FIG. 6 is also similar to the data flow of FIG. 3. Assuming that the following exemplary IP addresses are assigned for the Wi-Fi interfaces as convenient examples:

| | | |
|---|---|---|
| a | Sender: | 1.1.1.2 |
| b | AP of MN1 | 1.1.1.1 |
| c | Client of MN1 | 1.1.2.2 |
| d | AP of MN2 | 1.1.2.1 |
| e | Client of MN2 | 1.1.3.2 |
| f | AP of MN3 | 1.1.3.1 |
| g | Client of MN3 | 1.1.4.2 |
| h | AP of MN4 | 1.1.4.1 |
| i | Client of MN4 | 1.1.5.2 |
| j | Receiver | 1.1.5.1 |

Since a client interface of one WMR must be wirelessly connected to an AP interface of another WMR before sending any data through 802.11, Client interface of Sender and the AP interface of the mesh node MN1 are wirelessly associated. When data is sent from Sender's Client interface, the data will be directly sent to AP of MN1 by way of infrastructure mode WiFi. The data will then traverse up the OSI layer of MN1 to the IP layer of the AP interface. Noting that the packet is not destined to itself, it will then route the data to an appropriate interface using internal wired connection inside MN1 according to a pre-configured routing table using pseudo-codes like below:

```
If (IP == 1.1.1.1)
    Send it to Application
Else
    Send it to Client of MN1
```

As a result, the data will be routed to Client interface of MN1 using IP routing inside MN1. Client interface of MN1 and AP interface of MN2 will be wirelessly associated. When the data reaches the Client interface of MN1, it will be transmitted to AP interface of MN2 by way of infrastructure mode WiFi. Similarly, the data will then traverse up the OSI layer of MN2 to the IP layer of the AP side. Noting that the packet is not destined to itself, it will then route the data to an appropriate interface using internal wired connection inside MN2 according to the example routing table below:

```
If (IP == 1.1.2.1)
    Send it to Application
Else
    Send it to Client of MN2
```

In this example, the data will be routed to Client interface of MN2 using IP routing inside MN2. Client interface of MN2 and AP interface of MN3 are wirelessly associated. When the data reaches the Client Wi-Fi interface of MN2, it will be sent to the AP Wi-Fi interface of MN3 by way of infrastructure mode WiFi. The data will then traverse up the OSI layer of MN3 to the IP layer of the AP side. Noting that the data is not destined to itself, it will then route the data to an appropriate interface using internal wired connection inside MN3 according to the example routing table below:

```
If (IP == 1.1.3.1)
    Send it to Application
Else
    Send it to Client of MN3
```

Accordingly, the data will be routed to Client interface of MN3 using IP routing inside MN3. Client interface of MN3 and AP interface of MN4 are wirelessly associated. When the data reaches the Client Wi-Fi interface of MN3, it will be sent to the AP Wi-Fi interface of MN4 by way of infrastructure mode WiFi. The data will then traverse up the OSI layer of MN4 to the IP layer of the AP side. Noting that the data is not destined to itself, it will then route the data to an appropriate interface using internal wired connection inside MN4 according to the example routing table below:

```
If (IP == 1.1.4.1)
    Send it to Application
Else
    Send it to Client of MN4
```

In this example, the data will be routed to Client interface of MN4 using IP routing inside MN4. Client interface of MN4 and AP interface of Receiver are wirelessly associated. When the data reaches the Client Wi-Fi interface of MN4, it will be sent to the AP Wi-Fi interface of Receiver by way of infrastructure mode WiFi. The data will then traverse up the OSI layer of Receiver to the IP layer of the AP side. Since the Receiver is indeed the destination of the data, its IP layer will accept the data and forward it up according to the OSI model to its application below:

```
If (IP ==1.1.5.1)
    Send it to Application
Else
    Send it to the Internet
```

If the destination address of the data were not 1.1.5.1, it would have been routed to the interface leading to the Internet.

When data are sent from Receiver to Sender, the data will traverse in a similar way. Specifically, data is transmitted between different routers by way of infrastructure mode WiFi and routed inside a router using IP routing.

In the above examples, a data rate of 300 Mbps is chosen because this is the highest speed rate stipulated by the state-of-the-art WiFi standard. It will be appreciated that the actual data rate can be any data rate between 54 Mbps to 300 Mbps without loss of generality. For example, the inter-router data rate can be set as 60, 80, 100, 120, 150, 200, 250, 300, etc. Furthermore it wil be appreciated that the maximum data rate will be determined by the data rate set by the latest WiFi standard and can be well above 300 Mbps in the future.

While the present disclosure is with reference to the above examples, it would be appreciated by persons skilled in the art that the examples are only provided as illustrations to assist understanding and are not meant to restrict scope of invention. For example, each interface of a Wireless mesh router is flexible to be configured as AP or Client only if a Client of a router can be wirelessly connected to an AP of another router before sending data and all the interfaces of a wireless mesh router are connected using IP routing. Also, there can be any number of interfaces inside a wireless mesh router. Furthermore, when routers are used an examples herein, the disclosure above are applicable to other relaying devices such as forwarding devices and switches without loss of generality.

The invention claimed is:

1. A relaying device for forming a backbone of a multi-hop wireless mesh network, the relaying device comprising:
   a first wireless interface; and
   a second wireless interface,
   wherein the first wireless interface and the second wireless interface are configured to communicate with each other to facilitate wireless data communication between a first external device and a second external device,
   wherein the relaying device is configurable to switch amongst a plurality of configurations including:
      a first configuration wherein
         the first wireless interface is configured as an IEEE 802.11 infrastructure mode access point for the first external device and
         the second wireless interface is configured as an IEEE 802.11 infrastructure mode access point for the second external device, and
      a second configuration wherein
         the first wireless interface is configured as an IEEE 802.11 infrastructure mode client of the first external device and
         the second wireless interface is configured as an IEEE 802.11 infrastructure mode client of the second external device, wherein the second configuration is in accordance with operation of the first external device and the second external device as other relaying devices of the backbone of the multi-hop wireless mesh network.

2. A relaying device according to claim 1, wherein the first wireless interface and the second wireless interface are configured to communicate wirelessly at 300 Mbps or above.

3. A relaying device according to claim 2, wherein the first wireless interface and the second wireless interface are configured to communicate in a back-to-back manner to facilitate data communication between the first wireless interface and the second wireless interface.

4. A relaying device according to claim 1, wherein the first wireless interface and the second wireless interface are to communicate in a back-to-back manner to facilitate data communication between the first wireless interface and the second wireless interface.

5. A relaying device according to claim 1, wherein the relaying device is configured to operate as a router in infrastructure mode.

6. A relaying device according to claim 1, wherein the plurality of configurations further includes:
   a third configuration wherein
      the first wireless interface is configured as an IEEE 802.11 infrastructure mode access point for the first external device and
      the second wireless interface is configured as an IEEE 802.11 infrastructure mode client of the second external device, in accordance with operation of the second external device as another relaying device of the backbone of the multi-hop wireless mesh network.

7. A relaying device according to claim 1, wherein the first wireless interface is configured to communicate with the first external device using a first service set identifier and the second wireless interface is configured to communicate with the second external device using a second service set identifier.

8. A relaying device according to claim 1, wherein the first wireless interface has the same maximum Mbps speed in each of the modes of operation.

9. A relaying device according to claim 1, the relaying device further comprising:

a microprocessor coupled to the first wireless interface and the second wireless interface, wherein the microprocessor is configured to:
  obtain a network address associated with the first wireless interface;
  receive a network packet obtained using the first wireless interface;
  determine whether a destination of the network packet is the network address associated with the first wireless interface;
  if the destination of the network packet is not the network address associated with the first wireless interface, then route the network packet to the second wireless interface.

10. A relaying device according to claim 9, wherein the microprocessor is further configured to:
  if the destination of the network packet is the network address associated with the first wireless interface, then route the network packet to an application executing on the relaying device, wherein the application resides in a OSI layer different from the OSI layer of the first wireless interface.

11. A relaying device according to claim 1, wherein the multi-hop wireless mesh network is a first multi-hop wireless mesh network,
  wherein the relaying device communicates with a network adaptor, the network adaptor configured to interface with the first multi-hop wireless mesh network and a second multi-hop wireless mesh network different from the first multi-hope wireless mesh network.

12. A relaying device according to claim 6,
  wherein the relaying device further comprises a third wireless interface;
  wherein the first wireless interface, the second wireless interface, and the third interface are configured to communicate with each other to facilitate wireless data communication among the first external device, the second external device, and a third external device;
  wherein the first configuration further comprises the third wireless interface operating as an IEEE 802.11 infrastructure mode access point or as an IEEE 802.11 infrastructure mode client for the third external device;
  wherein the second configuration further comprises the third wireless interface operating as an IEEE 802.11 infrastructure mode access point or as an IEEE 802.11 infrastructure mode client for the third external device; and
  wherein the third configuration further comprises the third wireless interface operating as an IEEE 802.11 infrastructure mode access point or as an IEEE 802.11 infrastructure mode client for the third external device.

* * * * *